April 5, 1927.  E. D. SMYSER  1,623,502

ENGINE

Filed Oct. 19, 1923

Inventor
ELMER D. SMYSER
By Hazard and Miller
Attorneys

Witness
Wm. Hall.

Patented Apr. 5, 1927.

1,623,502

UNITED STATES PATENT OFFICE.

ELMER D. SMYSER, OF FELLOWS, CALIFORNIA, ASSIGNOR OF ONE-HALF TO ARCHIE R. FLETCHER, OF BRECKENRIDGE, TEXAS.

ENGINE.

Application filed October 19, 1923. Serial No. 669,550.

Although my present invention is referred to as an engine, it should be understood that this invention relates more specifically to the cooling system of an engine, it being an object of my improvement to provide an engine which normally burns a liquid or gaseous fuel, and which may be an explosion motor equipped with a breather exhaust pipe and with intake valves in its head as well as with lateral or auxiliary exhaust openings exposed at or near the end of a return stroke, with means for introducing, into a cooling jacket surrounding the same, a mixture of air, or the like, and cooling water, one of my preferred constructions being such that, by reason of an incidental pressure in the mentioned breather exhaust, any tendency of the lateral or auxiliary exhaust to become choked up is materially diminished or obviated.

It is an object of this invention to replace, in an internal combustion engine, a usual cooling liquid, such as water, with a mixture containing an aeriform body such as air; and my invention comprises, on the one hand, an engine provided with means connecting an exhaust, such as a breather pipe in which gases move alternately in opposite directions, with the inlet side of a cooling jacket, in such a manner as to permit of the sudden and intermittent introduction of air or exhaust gases, or mixture thereof, with water or the like, into and through a cooling jacket; and also, on the other hand, those methods of operating and cooling an engine which comprise the mentioned sudden and intermittent introduction of exhaust gases, or admixtures thereof, whether or not the organization employed is such as to effect also a consequent clearing of lateral or other additional exhaust openings extending from an engine cylinder.

It is an object of this invention to provide an explosion engine with a suitable valved pipe connecting an exhaust with an inlet pipe leading into a cooling jacket; and, in a preferred embodiment of my invention, this valved pipe may be in the form of an upwardly extending return bend or U-tube, one end of which may connect with a breather exhaust such as is currently used, on, for example, the Union engine, this engine being optionally provided with a "hit" and "miss" governor. The character of the governor employed upon an engine embodying or equipped with my invention may be regarded as immaterial, but it is an advantage of the described construction employing an upward extending U-tube that, the top of the U being above the level of my water reservoir, gravity cannot cause a flow of water into the breather exhaust mentioned; and the said U-tube is moreover more effective than would be a mere direct connection in reducing the temperature of the air or gas passing from the breather exhaust pipe into the inlet pipe leading to my engine jacket.

Although my present invention is directed primarily to the utilization of a connection extending from a suitably valved exhaust pipe to a jacket inlet, in clearing out both said jacket and additional exhaust ports, the sudden introduction of air, or the like, into a jacket being effective to loosen the deposits therein, and varying paths along which the cooling liquid may move, other objects of my invention will appear from the following description of a preferred embodiment thereof, taken in connection with the appended claims and the accompanying drawings, in which:

Fig. 2 is a transverse sectional view hereinafter referred to.

Figure 1:
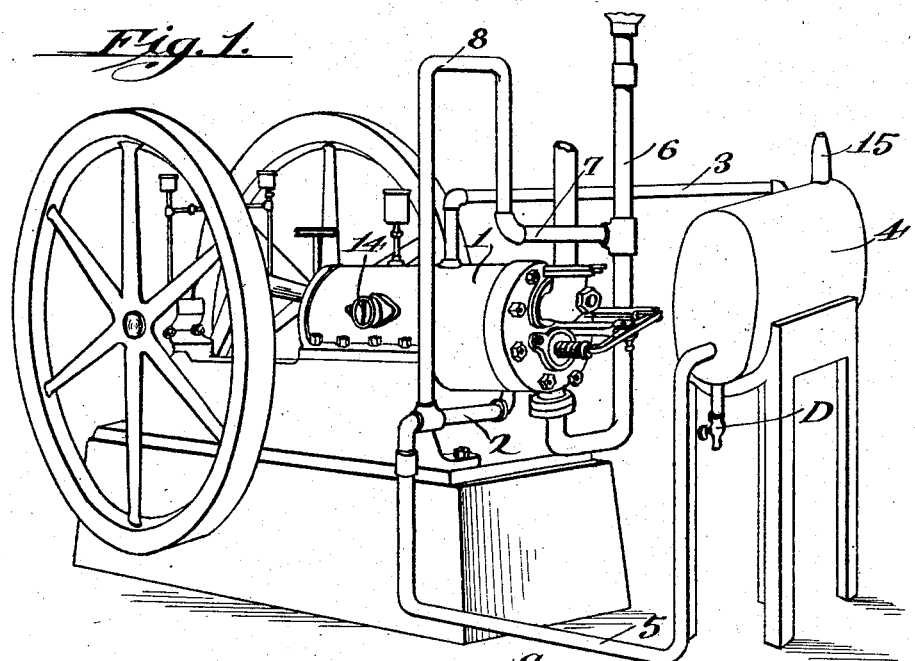
Fig. 1 is a perspective view showing an engine embodying or equipped with my invention.

Referring to the details of that specific embodiment of my invention which I have chosen for purposes of illustration, E may be an engine having an outer cooling jacket 1, provided with an inlet pipe 2, and an outlet pipe 3, the latter being adapted to return a cooling liquid, such as water, to a tank or reservoir 4, with which may be associated any desired cooling means not shown, and with means such as the valved pipe D for the withdrawal of deposits,—no pump, or any equivalent, being needed or optionally interposed in the supply pipe 5, preferably extending from a point near the bottom of the tank 4, in order to produce automatically a continuous or intermittent circulation of the cooling liquid through the mentioned jacket.

Figure 2:
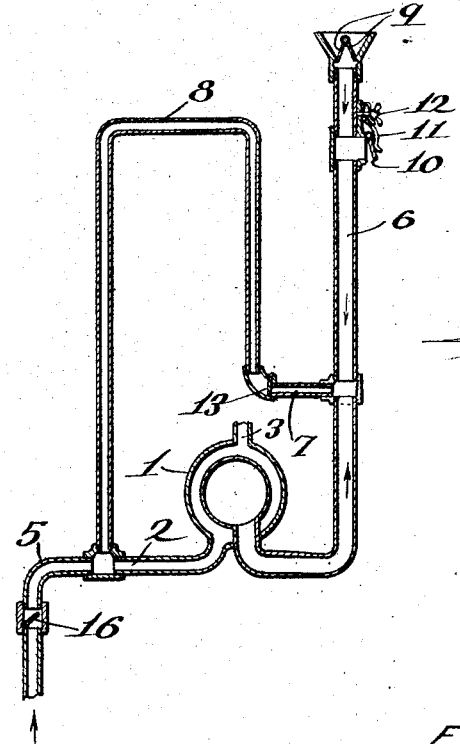

Coming now to the strictly novel features of my invention, 6 being a breather exhaust pipe connected with the head of my engine, I provide therein a lateral opening connected, as by means of a short pipe or nipple 7, to upwardly extending inverted U-shaped pipe 8, constituting a return bend, one leg of which extends to and communicates with the inlet pipe 2, leading to the cooling jacket 1. The construction here referred to being intended to cause a sudden and intermittent introduction of exhaust gases into the jacket 1 from the breather 6, the latter is preferably provided with an inwardly opening valve or valves 9, and also with an outwardly opening release valve 10, shown as normally held closed by resilient means such as the spring 11, provided with an adjusting screw 12. By the means referred to, although the familiar backward and forward movement of the gases through the breather 6 is substantially checked, large volumes of gas being suddenly forced through the mentioned U-tube, and their return being prevented by means such as a check valve 13; a relatively large proportion of exhaust gases being ultimately discharged through the lateral or supplemental exhaust ports 14, both the jacket of my engine and the exhaust ports last referred to are effectively cleared of all sedimentary or other deposits, in such manner that the efficiency of both my cooling system and my engine proper are substantially increased; and although rather large quantities of exhaust gases may be incidentally forced through the jacket 1, these may be permitted to escape from my cooling system at any convenient point, as by means of a pipe 15 extending upward from the tank or reservoir 4, and any undesired backward movement of the cooling liquid circulated by thermal means, or its equivalent may be obviated as by means of a suitably disposed valve 16 which may be interposed in the manner suggested in Fig. 2; and the length and character of the return bend or U-tube 8 are preferably such, this tube rising above the highest point of the mentioned circulating system, that no movement of liquid can occur therethrough, although the exhaust gases may be substantially cooled therein and in advance of their admixture with the water or other cooling liquid delivered through the pipe 5.

The exhaust check valve 9 may be of any suitable type; and is shown constructed of two flaps pivoted at their top which normally hang downward and open the valve. The exhaust of the engine closes the valve 9 and forces open the exhaust valve 10 as described. The sudden stopping of the exhaust gas by the valve 9 accentuates the by-passing of the exhaust gas through the pipe 8 into the circulating water system. When the pressure of the exhaust on the valve 9 ceases these valves will open to the air.

On account of the sudden stoppage of the exhaust gas by the valves 9, the gas has an outlet from the breather 6 only through the exhaust valve 10 and the by-pass pipe 8. The tension of the spring 11 may be adjusted to regulate in practice the amount of gas which will be exhausted into the by-pass, and an amount which will be exhausted into the release valve 10. Between the fire strokes the spring will close the valve 10 while the gas is in motion through the by-pass pipe 8 and on account of the exhaust gas having a violent impulse due to the exhaust and the inertia of the gas, it will continue on its travel and suck the exhaust gas from the breather pipe 6 behind the gas projected through the by-pass by the initial impulse. Thus, as the valve 10 is closed and the flap valves 9 are opened, air will be drawn in to the breather and will follow the exhaust gas through the by-pass.

It is not necessary that the pressure of the gas in the by-pass be constantly less than atmospheric, in fact during the exhaust impulse it will probably be considerably above atmospheric pressure and due to the inertia of the gas represented by its continuous movement, after the impulse there will probably be periods between the exhaust strokes when the pressure is less than atmospheric. This matter will of course depend on the construction of the valves and the relatively free flow of the exhaust gas through the by-pass.

The air which becomes trapped in the by-pass by entering therein, will be forced through the water jacket by the next exhaust stroke. It is not the intention of the construction that all the gas passing through the by-pass 8 will be air. There is a mixture of air and exhaust gases.

As this system is designed for relatively slow exhausting engines and engines which do not fire on every stroke and hence give a considerable period between exhausts, the gas confined in the breather has an opportunity to cool and hence contract and in such contraction will draw air into the breather through the valves 9, part of which on the next exhaust stroke will be forced through the by-pass.

The principles of my invention are of course applicable to internal combustion engines and motors generally, the foregoing being merely a selected example.

Although I have herein described one complete embodiment of my invention, it will be obvious that various features thereof are capable of independent use, and also that various modifications might be made without a departure from the spirit and scope of my invention as the same is indicated above and in the following claims.

What I claim is:

1. The combination with an engine having a water circulating system comprising a water jacket, a water tank and water circulating piping between the water jacket and the tank, an engine exhaust pipe, a pipe to by-pass some of the exhaust gas into the water circulating system, and means in the exhaust pipe to introduce air into the exhaust pipe, the by-pass pipe and the water circulating system.

2. The combination with an engine having a water circulating system comprising a water jacket, a water tank and water circulating piping between the water jacket and the tank, an engine exhaust pipe, a pipe to by-pass some of the exhaust gas into the water circulating system, and an inwardly opening check valve in the exhaust pipe to introduce air into the exhaust pipe and by-pass pipe in the periods between the exhaust strokes and into the water circulating system.

3. The combination with an engine having a water circulating system comprising a water jacket, a water tank, inlet water piping from the tank to the water jacket, outlet water piping between the water jacket and the tank, an engine exhaust pipe, a pipe to by-pass some of the exhaust gas into the water inlet pipe, and means in the exhaust pipe to introduce air into the by-pass pipe and thence into the circulating system.

4. The combination with an engine having a water circulating system comprising a water jacket, a water tank, inlet water piping from the tank to the water jacket, outlet water piping between the water jacket and the tank, an engine exhaust pipe, a pipe to by-pass some of the exhaust gas into the water inlet pipe, and an inwardly opening check valve in the exhaust pipe to introduce air into the exhaust pipe and by-pass pipe in the periods between the exhaust strokes and into the water circulating system.

5. The combination with an engine having a water circulating system comprising a water jacket, a water tank, a water inlet pipe leading from the lower portion of the tank to the lower portion of the water jacket, a water outlet pipe leading from the upper portion of the water jacket to the upper portion of the tank, an engine exhaust pipe, a by-pass from the exhaust pipe to the inlet pipe and having a portion above the level of the water in the water jacket and the water tank, an inwardly opening check valve on said exhaust pipe to forcibly cause the by-passing of exhaust gas on the exhaust stroke and to introduce air into the exhaust pipe and by-pass between the exhaust strokes, and a release valve acting against pressure on said exhaust.

6. The combination with an engine having a water circulating system comprising a water jacket, a water tank, a water inlet pipe leading from the lower portion of the tank to the lower portion of the water jacket, a water outlet pipe leading from the upper portion of the water jacket to the upper portion of the tank, an engine exhaust pipe, a by-pass from the exhaust pipe to the inlet pipe and having a portion above the level of the water in the water jacket and the water tank, a check valve in said by-pass, an inwardly opening check valve on said exhaust pipe to forcibly cause the by-passing of exhaust gas on the exhaust stroke and to introduce air into the exhaust pipe and by-pass between the exhaust strokes, and a release valve acting against pressure on said exhaust.

In testimony whereof I have signed my name to this specification.

ELMER D. SMYSER.